Figure 1:
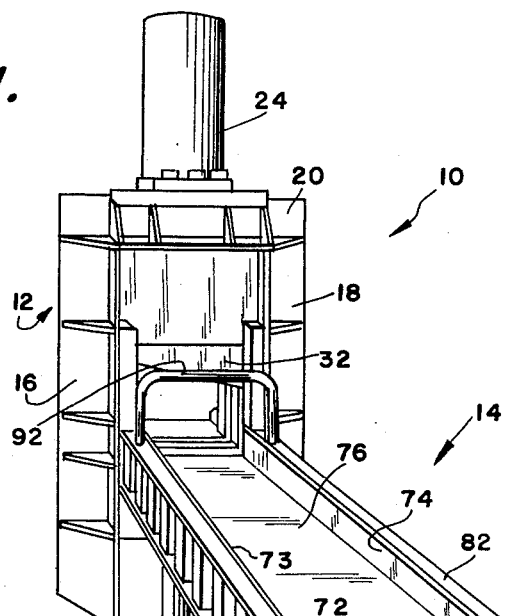

Nov. 17, 1964  W. M. THOMPSON  3,157,082
METHOD AND APPARATUS FOR WORKING SCRAP METAL
Filed Jan. 12, 1962  4 Sheets-Sheet 1

INVENTOR.
WALLACE M. THOMPSON
BY
Cushman, Darby & Cushman
ATTORNEYS

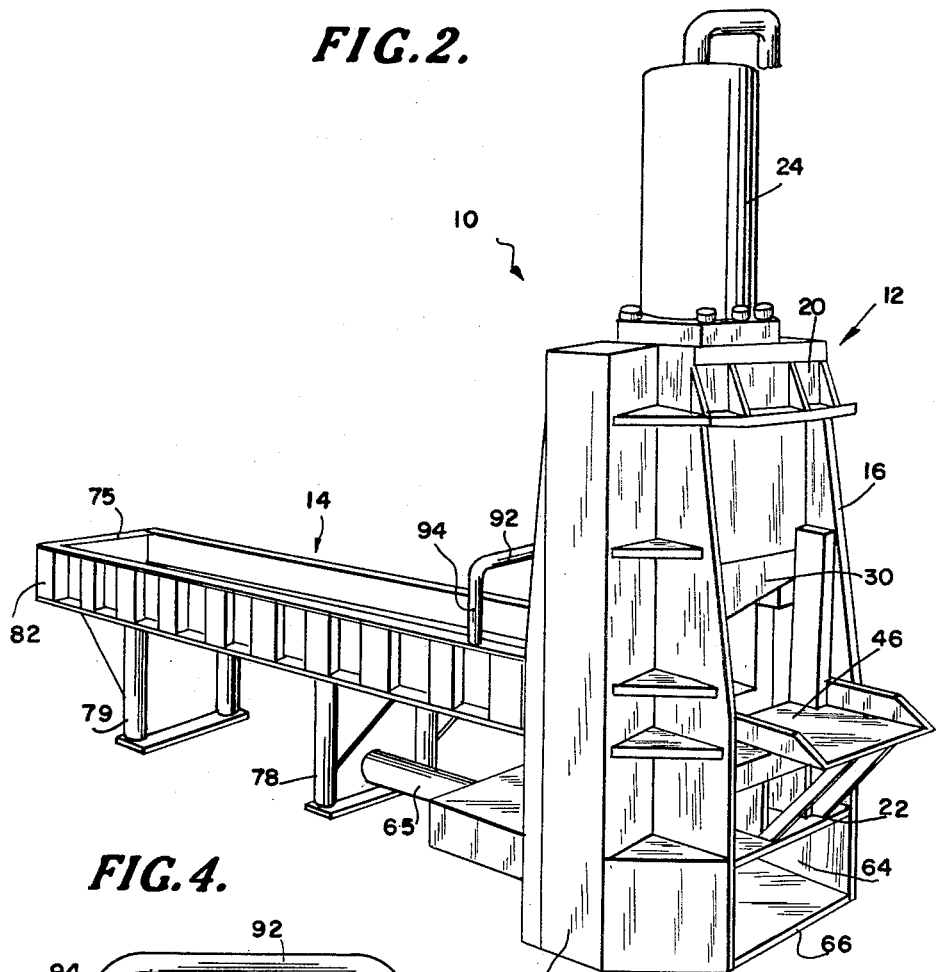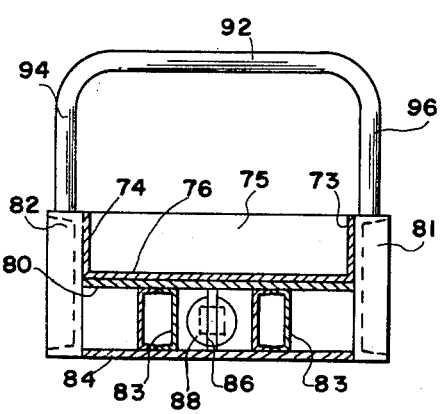

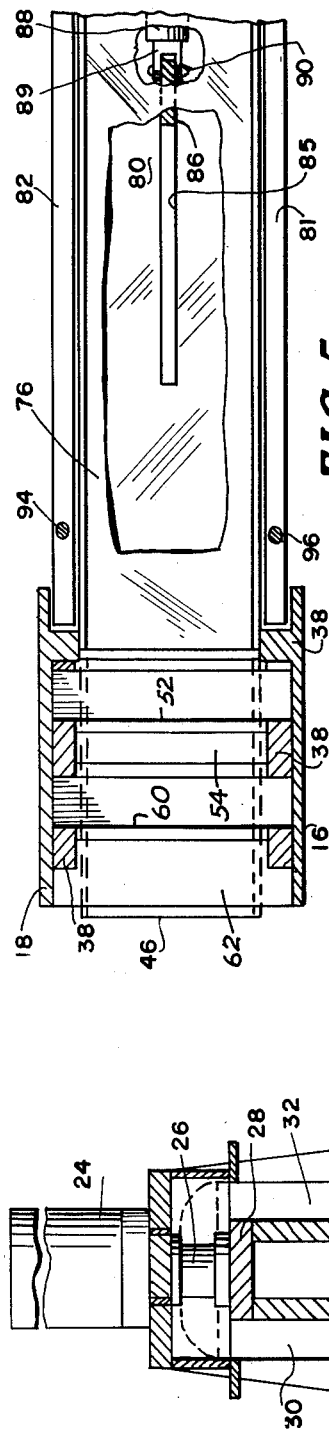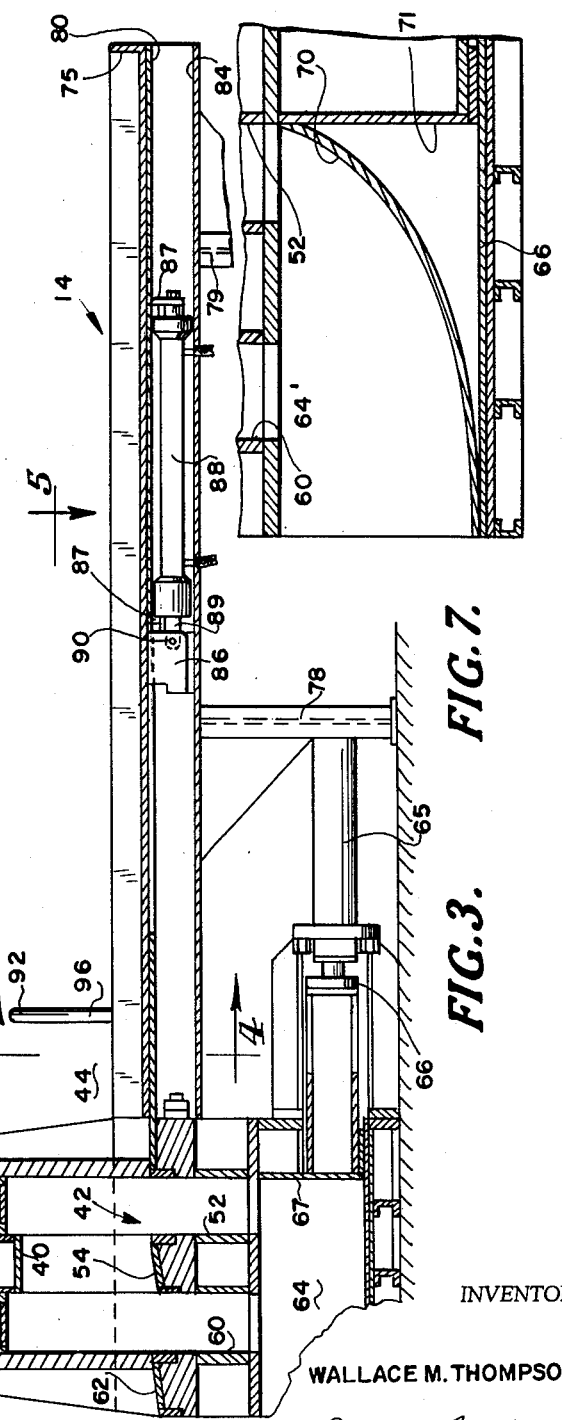

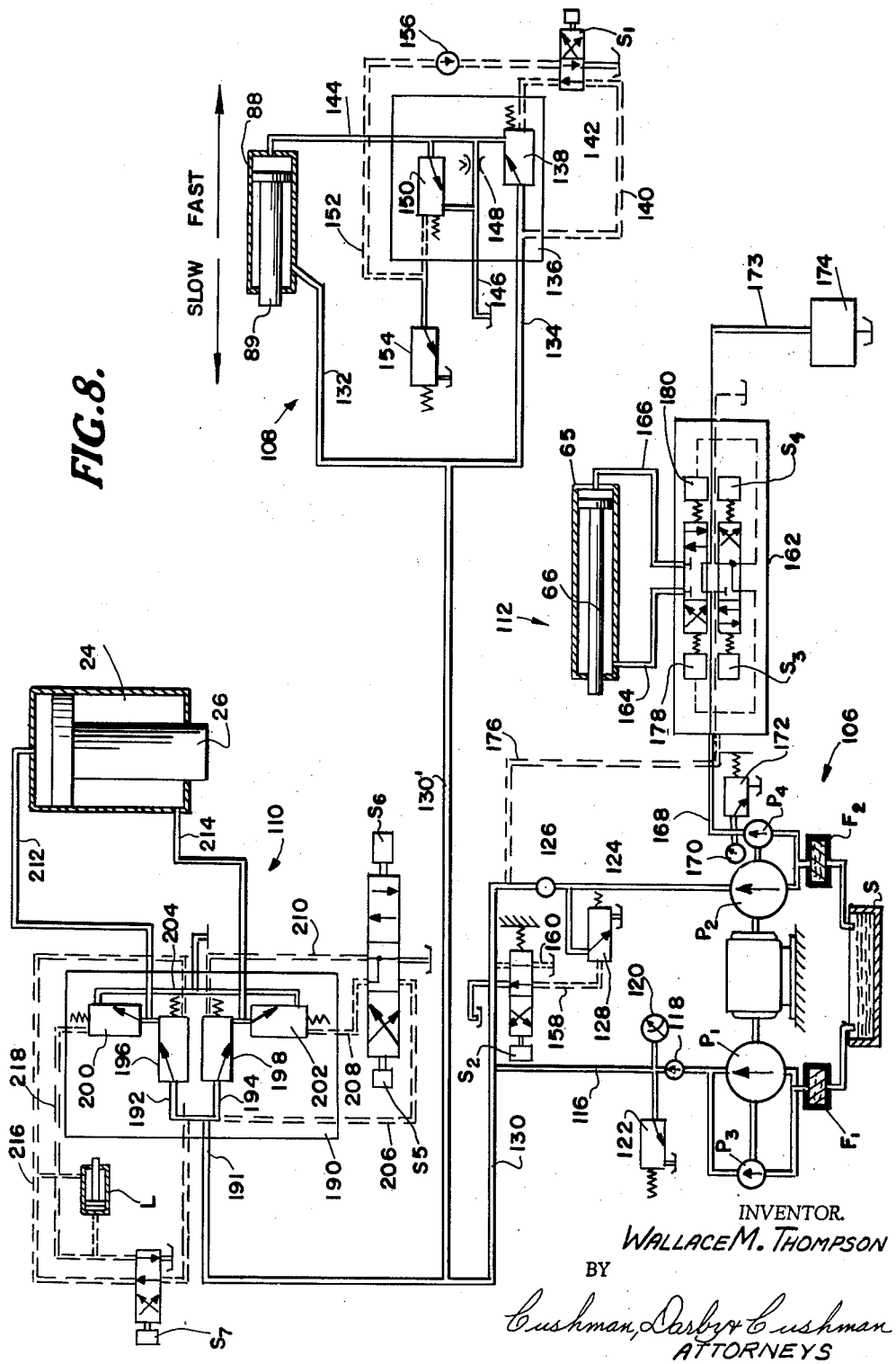

United States Patent Office 3,157,082
Patented Nov. 17, 1964

3,157,082
METHOD AND APPARATUS FOR WORKING SCRAP METAL
Wallace M. Thompson, Cordele, Ga., assignor to Harris Foundry & Machine Company, Cordele, Ga., a corporation of Georgia
Filed Jan. 12, 1962, Ser. No. 165,840
18 Claims. (Cl. 83—23)

This invention relates to a machine for shearing scrap metal and, more particularly, to improvements in a multiple-cut shear, i.e., a shearing machine which has more than one pair of cutting blades or edges.

Scrap metal shears usually are provided with but a single pair of cutting blades, usually one arranged in a horizontal fixed position, and the other arranged for vertical reciprocation with respect thereto. Scrap normally is fed between the blades from a feeding table which essentially has one end thereof terminating in the fixed blade. Scrap is fed along the table, usually by a hydraulic ram, and is pushed over or across the fixed blade between successive shearing operations.

In a multiple-cut shear, however, the machine is provided with more than one set of shearing blades. For example, the machine may have two pairs of shearing blades: the two fixed blades being spaced apart horizontally to provide a gap or slot therebetween for reception of a vertically movable shearing plate or blade having cutting edges along its opposite lower edges, cooperating with these two spaced fixed blades. In an arrangement of this nature, it will be seen that feeding scrap between the fixed and movable blades by a conventional hydraulic ram gives rise to difficulties. If scrap to be sheared were simply pushed along a feed table across the fixed blades, some of such scrap might droop or drop somewhat into the chute between the two fixed blades so that it would encounter the side wall of the chute remote from the feed table and thus render further feeding difficult if not completely impossible. Under such circumstances, of course, the pairs of fixed and movable blades remote from the feed table would be inoperative because no scrap would be extended thereacross.

Accordingly, it is an object of this invention to provide an improved method and apparatus for feeding scrap metal to a shearing machine having more than a single pair of cutting blades.

It will be seen that a multiple-cut shear possesses the advantage of cutting off two pieces of scrap metal, instead of one, at each operation of the shear. It further will be seen that if additional pairs of shearing blades are provided, that the number of pieces of scrap which are cut off at each operation of the shear are proportionately increased. Thus, for example, if four pairs of shearing blades are provided, four pieces of scrap can be cut off at each operation of the shear. Increasing the number of pairs of shearing blades, however, obviously results in an increased power requirement if all of the blade pairs operate simultaneously.

It is therefore, another object of this invention to provide an improved multiple-cut shear wherein the power requirements are not unduly increased over those for a single-cut shear.

Another object of this invention is the provision of a shearing apparatus having a shear bed with inlet and discharge sides, and a shearing blade movable across the shearing bed; a feed table is positioned adjacent the inlet side of said shear, receiving a shallow, oblong feed pan which is adapted to move across the shear bed. Means are provided for moving this feed pan at a relatively slow speed across the shear bed to deposit scrap metal beneath the shear blades and retract the same at a sufficient speed to pull the feed pan from beneath the scrap metal, leaving the scrap metal in proper position for shearing or the like. Accordingly, the preferred embodiment of the present invention contemplates the provision of hydraulic circuit means operative to move the feed pan in the manner described in timed sequence with the operation of the shear.

Still further according to this invention, there is provided the combination of a multiple-cut shearing apparatus, the blades being longitudinally spaced apart, together with a shearing bed having stationary shearing surfaces adjacent each blade of different vertical heights so that the shearing forces are minimized. Together with this arrangement, a hydraulically operated feed pan of elongated, shallow construction is moved in a dual-speed manner, as described, to efficiently feed the scrap metal to the shearing blades in an inexpensive and notably superior manner.

Still further according to this invention, there is provided: (1) the combination of a multi-cut shearing apparatus with an elongated reciprocating feed table operative to position scrap material in a feed stroke beneath the shear blades and rapidly retract, leaving the scrap material beneath the shear blades; (2) a multi-blade shearing apparatus having blade widths and shear bed widths of susbtantially equal size, the feed pan being movable thereacross to position the scrap metal for shearing into chunks of substantially equal size; and (3) new and improved means for collecting the scrap metal sheared by the shearing means.

These and still further objects, advantages and novel features of the present invention will become apparent in the specification and claims, taken in connection with the accompanying drawings.

Figure 6:
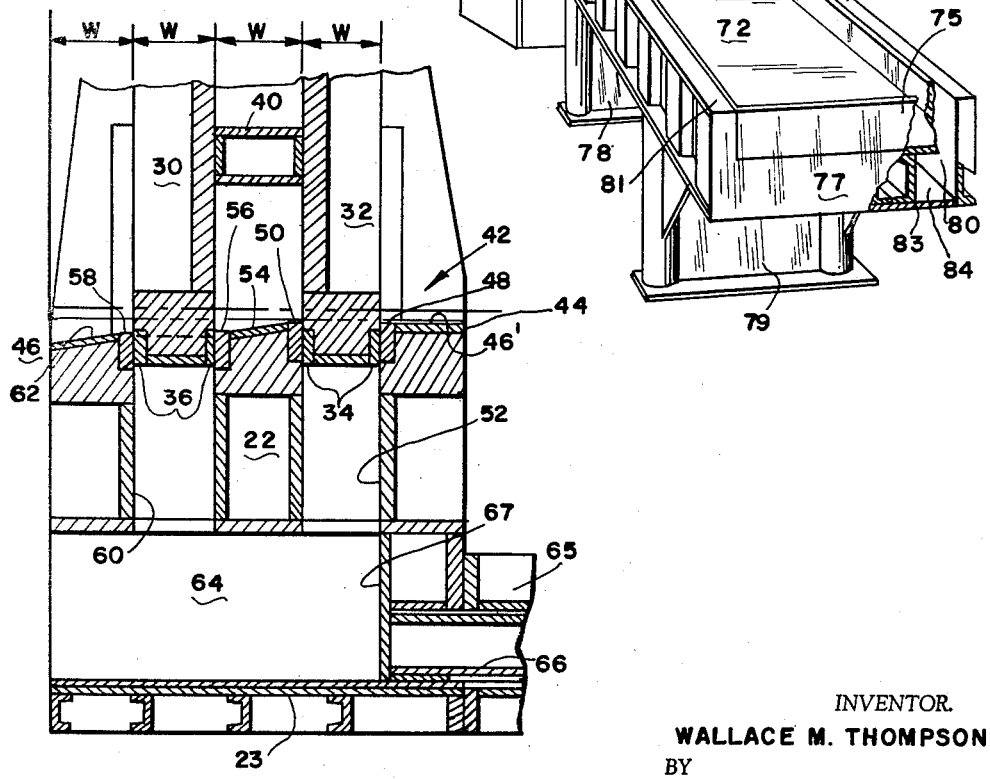

In the drawings:
FIGURE 1 is a perspective view of a shearing machine embodying this invention viewed from the feed end thereof;
FIGURE 2 is a perspective view of the machine shown in FIGURE 1 but viewed from the discharge end thereof;
FIGURE 3 is a longitudinal vertical sectional view of the machine shown in FIGURE 1;
FIGURES 4 and 5 are sectional views taken substantially along lines 4—4 and 5—5, respectively in FIGURE 3;
FIGURE 6 is an enlarged fragmentary vertical elevation sectional view of the shearing elements of the machine shown in FIGURE 1;
FIGURE 7 is a view similar to FIGURE 6, but showing a modified form of sheared material collecting means; and
FIGURE 8 is a diagrammatic view of the hydraulic system of the machine shown in FIGURE 1.

Referring now to the drawings, there is shown a scrap metal shearing machine 10 which includes a multiple-cut shear 12 and a feed table 14 of elongated construction.

The shear 12 includes spaced upright reinforced side frames 16 and 18, a top transverse frame 20 and a lower transverse frame portion 22 and base framing 23, all joined to the side frames 16 and 18. A hydraulic cylinder 24 is mounted on the top frame 20 and carries a depending piston 26. Joined to the depending piston 26 of the cylinder 24 is a vertically movable shearing head 28 carrying a pair of longitudinally spaced shear plates 30 and 32.

The shearing plates 30 and 32 have opposed inserts 34, 36, respectively, along their lower opposite edges, forming thereby four transversely inclined shearing edges. These blades 30, 32 are vertically movable, as is apparent, and guided in a vertical path by suitable spacer members 38, while a central stationary stripper member 40 is carried between the blades.

The width of the shear blades 30, 32, FIGURE 6, preferably is identical and also equal to the distance therebetween, these distances being designated in FIGURE 6 by the letter W. The shear 12 has a stationary shearing bed 42, an inlet end 44 and an opposite discharge end 46. This shearing bed 42 includes a surface 46' that constitutes an extension of and is flush with the upper surface of the feed table 14. The surface 44 terminates in a fixed blade 48 defining a transverse horizontal shearing or cutting edge adjacent the shear blade 32.

An opposed fixed blade 50 is positioned in spaced relationship to the blade 48, and at the same elevation, providing thereby a first chute 52 for reception of the blade 32 during its downward stroke. The bed 42 then tapers downwardly on an intermediate surface 54, from the blade 50 to another fixed blade 56 operatively positioned adjacent the path of movement of the shear blade 30. Carried opposite the fixed blade 56 is another fixed blade 58 adjacent the opposite side of the shearing blade 30, defining thereby a second chute 60, receiving the shearing blade 30 during its downward stroke. The bed 42 then tapers downwardly again along surface 62 towards the discharge end 46 of the shearing bed 42. The blades 48 and 50 cooperate with the shear blade 32 and at a higher elevation than the opposed fixed blades 56 and 58 for cooperation with the shear 30 so that the shearing forces are thereby evenly distributed.

The chutes 52 and 60 beneath the shear bed 42 communicate with an enlarged chamber 64 opening in the rearward discharge end 46 of the shear 12, as best shown in FIGURE 6. The base framing 23 defines the bottom wall of the chamber 64 and is joined to the side frames 16 and 18 in the known manner.

Carried opposite the discharge side of the chamber 64 is a horizontally positioned hydraulic ejecting cylinder 65 having a piston rod 66 received in the chamber 64. The piston rod 66 carries an ejecting plate 67 for discharging the material which has been sheared and has dropped into the chamber 64.

As an alternative construction to the arrangement of the chamber 64 and the hydraulic ejection cylinder 65, FIGURE 7 shows the chamber 64' carrying a plate 70 which is inclined downwardly from the vertical wall 71 opposite the discharge end 46 of the shear 12. The sheared scrap metal thereby falls by gravity out of the shear.

Reference is now made to the construction of the feed table 14. The feed table 14 includes a rectangular pan 72 having opposed side walls 73 and 74, and an end wall 75 opposite the inlet end 44 of the shear. The pan 72 is of relatively shallow construction and includes a bottom wall 76 of a relatively smooth upper surface joined to the side walls 73, 74, and the end wall 75 as by welding. The pan 72 is carried by a stationary bed 77 which is supported in a generally horizontal plane by longitudinally spaced apart stanchions 78, 79.

Also, the bed 77 is joined to the shear 12 adjacent the inlet side 44 as by bolts or the like (not shown) to facilitate its assembly and disassembly for transportation purposes or the like.

The bed 77 has a top plate 80 for receiving the pan 72, and has upstanding opposed side walls 81 and 82, composed of longitudinal channels, FIGURE 4, positioned adjacent the respective side walls 73 and 74 of the pan 72. By virtue of this arrangement, the pan is slidably nested in the bed 77 and is operative for movement through the shear bed 42, as will become apparent. Longitudinally extending reinforcing channels 83 are carried beneath the top blade 80 in generally spaced apart relationship, and a bottom plate 84 completes the bed construction.

The top plate 80 of the bed 77 has a longitudinally extending slot 85 (FIGURE 5), and, depending from the undersurface of the pan bottom wall 76 is a lug 86 which extends through the slot 85 for slidable movement therein. Joined to the underside of the bed plate 80 are depending struts 87 carrying a hydraulic cylinder 88 having an extending piston rod 89, and is joined to the lug 86 by a pin 90. The stroke of the hydraulic piston 89 corresponds generally to the length of the slot 85 so that activation of the cylinder 88 is operative to move the pan 72 across the shear bed 42. A horizontally extending rod 92 is positioned above the pan 72 adjacent the feed end 44 of the shear 12, corresponding to the allowable height of material which can be received in the bed 42 of the shear 12. The rod 92 has depending legs 94 and 96 joined to the bed channels 81 and 82, respectively. This rod 92 is positioned immediately adjacent the shear 12 so that material having a greater height than can be accommodated by the shear is restricted from entrance therein.

Considering now the entire assembly, the pan 72 is operated by the hydraulic cylinder 88 to move the pan across the shearing bed 44 to an extreme position adjacent the discharge 46 of the shear bed. Thus, when scrap metal or the like is deposited onto the pan 72, the piston 89 moves at a relatively slow feed stroke, carrying the scrap metal across the shear bed; and, after reaching this extreme position, shown in phantom lines in FIGURES 3 and 5, the pan 72 is quickly retracted at a sufficient speed to literally pull the pan bottom wall 76 out from beneath this scrap metal. The hydraulic shear cylinder 24 is then actuated and the shear blades 30 and 32 shear the scrap metal, the metal chunks then falling into the chamber 64. By virtue of the spacing of the shear blades and the shearing surface, four chunks of scrap are to be formed of substantially equal size. The metal remaining on the surfaces 54 and 62 which does not fall into the chamber 64 is simply removed from these surfaces during the next subsequent feed stroke of the pan 72, the material on the surface 54 falling into the chamber 64 via chute 52, while the remaining material falls over the discharge end 46 of the shear.

Referring now to FIGURE 8, there is shown a hydraulic circuit operative to move the feed cylinder 88 at a slow speed across the shear bed and a rapid speed back to its initial position. The hydraulic circuit for operating the various cylinders includes generally a hydraulic power source 106; control means 108 for operating the feed pan cylinder 88; control means 110 for operating the shearing cylinder 24; and, control means 112 for operating the ejecting cylinder 65.

The power supply means 106 includes an electric motor 114 driving two identical opposed pumps $P_1$ and $P_2$; the drive means also operates adjacent pumps $P_3$ and $P_4$, respectively. The pumps $P_1$, $P_3$, and $P_2$, $P_4$ are connected at their inlet sides to a sump S via oil filters $F_1$ and $F_2$, respectively. The pumps $P_1$ and $P_3$ discharge to a common outlet line 116 which line carries a check valve 118, pressure gauge 120, and pressure relief valve 122 connected to the sump.

In a generally similar manner, the discharge line 124 from the pump $P_2$ carries a check valve 126 and an unloading valve 128 connected to the sump. The lines 124 and 116 are connected to a common line 130 which provides the hydraulic pressure for operating the pan controlling means 108 and the shear means 110.

A main line 130' is connected to the line 130 for operating the control means 108 of the feed pan 72. In this regard, the line 130' divides into a branch 132 adjacent the feed cylinder 88 at the extreme feed position wherein the cylinder 88 has moved the pan 72 across the bed 44 of the shear 12. The opposite branch 134 is connected to a conventional three-way valve 136 having an unloading valve 138. A branch line 140 bypasses one side of the unloading valve 138 and extends to the opposite side thereof at 142. Connected to this valve 138 in a line 144 leading to the opposite side of the hydraulic cylinder 148 for feeding hydraulic fluid therein. A branch line 146 is connected to this line 144 and to the sump via a restriction orifice 148. A second branch is connected to another unloading valve 150, which valve is also connected to the branch 146 downstream of the orifice. Another line 152 is in connection with the valve 150 at the one end thereof and with the sump at the other end. Another relief valve 154 is connected with the line 152, likewise leading to the sump. The line 152 conveniently carries an orifice check valve 156 in the usual manner. There is provided a conventional solenoid operated four-way valve $S_1$. As shown, this valve is positioned to direct fluid flow from the line 140 to the line 144 via line 142 and return fluid from line 156 to the sump.

Referring back to the line 124 leading from the sump $P_2$, there is provided a line 158 leading from the unloading valve 128 to the sump, and a line 160 adjacent thereto is connected from the main line 130 to the sump. A solenoid operated four-way valve $S_2$ is joined to these lines 158 and 160, having a first position providing the above-described connection between these lines and movable to a second position to reverse their connections.

The connection of the circuit controlling the ejecting cylinder 65 and the associated control means 112 will now be discussed. There is provided a four-way valve 162 operative to regulate the flow of hydraulic fluid to opposite ends of the cylinder 65 via hydraulic feed lines 164 and 166. The valve 162 is of conventional and well-known construction, receiving hydraulic fluid from pump $P_4$ via line 168 which line carries, again, a pressure gauge 170 and a relief valve 172 connected to the sump. The opposite outlet side of the line 168, joined to the valve 162, is likewise connected downstream to the sump via line 173 having an oil cooler 174. Another line 176 is connected to the line 124 from the pump $P_2$ and to the valve 162, likewise having a connection to the sump in the usual fashion. The valve 162 carries the upper opposed solenoids $S_3$ and $S_4$. As shown in the drawing, no solenoid is actuated and the cylinder 65 is maintained in a stationary position. Hydraulic pressure pistons 178 and 180, are operative to connect the selected line 164 or 166 to the hydraulic fluid pressure line, as is apparent.

Reference is now made to the control means 110 operative to drive the shear cylinder 34. In this regard, a conventional differential valve 190 is connected to the pressure line 130 as at 191, this line dividing into branches 192 and 194, connected to unloading valves 196 and 198, respectively. Second opposed unloading valves 200 and 202 are in communication with the respective first valves 196 and 198 and with one another via a line 204, which latter line also has a connection to the sump. A branch line 206 is connected to the line 191 at one end, leading to the valve 202 at 208. Another line 210 is connected to the valve 198 at one end and to the sump at the other end, line 208 also being connected to the sump when the cylinder 24 is inoperative, as shown in FIGURE 8. There are provided opposed four-way valves, solenoid operated, designated as $S_5$ and $S_6$, respectively. Valve $S_5$, when actuated, connects line 208 to sump while the pressure line 206 to line 210. Conversely, when solenoid $S_6$ is actuated, line 210 is directed to sump while pressure line 206 is connected to line 208. Also, there are provided pressure supply lines 212 and 214 connected to the upper and lower respective ends of the cylinder 24, line 212 being connected to the branch between valves 196 and 200, while the lower line 214 is connected to the branch between the valves 198 and 202.

There is also provided a lubricating cylinder L controlled by a solenoid operated four-way valve $S_7$ with a line 216 connected to the valve 196, and the pressure line 191, while another line 218, adjacent thereto is connected to the sump and to valve 200. Of course, actuation of the four-way valve $S_7$ reverses the connection between lines 216 and 218.

*Operation of the Hydraulic Circuit*

During idling, of course, there are no solenoids actuated, the various cylinders being in a stationary position. During the initial feed stroke of the hydraulic piston 89 which is at a relatively slow speed, the cylinder 88 is adapted to operate against a restraining force due to the fluid introduced into the opposite side of the cylinder through the line 132; however, the line 132 is of substantially smaller size than the opposite line 144. The solenoids $S_1$ and $S_5$ are now actuated. This causes pressure fluid to flow through lines 130, 130', 134, 140, and 142, through valve 138, and through the feed line 144 and into the cylinder, thereby moving the pan 72 towards the shear bed at a relativley slow speed due to the restraining force occasioned by the pressure in the opposite side of the cylinder. Solenoid $S_5$, being actuated directs pressure fluid from line 130 through line 206, valve $S_5$, through line 210, valve 198 and into line 214, raising the piston 26 and the shear blades. As will be appreciated, any suitable time delay means may be provided as necessary to ensure the piston 26 is raised before the cylinder 88 actually moves the feed pan into the bed 42 of the shear 12.

At the end of this relatively slow feed stroke, a limit switch (not shown) is tripped by the cylinder 88 or the like, providing actuation only of the solenoids $S_2$ and $S_5$. Solenoid $S_1$, of course, is de-energized and the cylinder 88 is rapidly retracted as follows: pressure being only in the line 132 and acting oppositely on the cylinder 88 provides the reverse movement of the cylinder 88. The fluid pressure line 134, 140, is bypassed to the sump and likewise the fluid line 144 is also bypassed to the sump via the line 142 so that there is substantially no restraining force on the opposite side of the cylinder and the retracting force of the piston is very rapid. As will be appreciated the cylinder 88 may include a throttling valve adjacent line 144 to cushion the return stroke of the piston 89. Solenoid $S_2$, being actuated, at the end of the retracting stroke, relieves the pressure in the line 130, discharging fluid to the sump via the unloading valve 128 and line 158.

Next, all the solenoids are deactuated except for solenoids $S_7$ and $S_6$; solenoid $S_7$ operates the lubricator L in the known manner; solenoid $S_6$ provides connection of lines 206, 208 and 204 and thence to sump, line 210, likewise being connected to the sump. Solenoids $S_7$ and $S_6$ move the piston 26 downwardly to shear the material. In this regard, hydraulic fluid is connected to line 212 via line 191, line 216 leading to valve 196 and thence to line 212. Valve $S_6$, being actuated, directs the pressure fluid from the opposite side of the cylinder 66 through line 214, valve 198, and line 210 to sump. In the meantime fluid pressure is relieved in the line 191 by fluid flow through line 206, then to line 208, valve 202, line 204 and then to the sump via the branch connection thereto; and via valve 200 and line 218 to sump. Accordingly, the restraining force acting against the downward force on the piston 26 is removed to provide the desired cutting force.

The shears then move upwardly by actuating only the solenoid $S_5$, thereby directing pressure fluid through lines 191, 206, 210, valve 198, and line 214. Fluid pressure is relieved from the opposite side of the cylinder 24 through line 212, valve 196, and to the sump via line 216.

The ejection cylinder 65 is operated simply by actuation of the solenoid $S_3$, directing fluid through line 176 to the hydraulically actuated piston 178 and to line 166, while fluid pressure is relieved from the opposite side of the cylinder 65 through line 164 and thence to the sump via line 173. Conversely, the ejection cylinder 65 is then retracted by actuating solenoid $S_4$ so that fluid flows through line 176 to the opposite hydraulic port 180, thereby communicating line 168 with line 164. Fluid pressure is relieved in line 166 to the sump via the line 173.

The cycle is then completed, and the same may be repeated automatically or the entire apparatus allowed to idle, wherein no solenoids are actuated. As will be appreciated by those skilled in the art, any suitable electric circuit may readily be provided to actuate the solenoids in their desired sequence, as by the use of limit switches or the like. Significantly, the operation of the cylinder 88 in the manner described to provide a relatively slow feed stroke and a retracting stroke of sufficient speed to literally pull the scrap metal from the shear bed provides a novel and notably superior arrangement for feeding the material to the shear. Also, alternative means for providing the dual speed of the feed cylinder will become apparent; e.g., electric motor drives, and the like.

From the foregoing description of the various embodiments of this invention, it is evident that the objects of this invention, together with many practical advantages are successfully achieved. While preferred embodiments of my invention have been described, numerous further modifications may be made without departing from the scope of this invention.

Therefore, it is to be understood that all matters herein set forth or shown in the accompanying drawings are to be interpreted in an illustrative, and not in a limiting sense.

What is claimed is:

1. A method of feeding scrap metal to a shear having at least one horizontal fixed blade comprising the steps of: placing scrap metal to be sheared on a horizontal support; moving the support at a relatively slow speed across the fixed blade, and then jerking the support from beneath the scrap metal at a speed sufficient to pull the support from beneath the scrap metal without substantially displacing the latter whereby the scrap metal will be positioned to be sheared across the fixed blade.

2. A method defined in claim 1 including the additional step of cutting the scrap metal into a plurality of longitudinally spaced chunks.

3. Apparatus for working scrap metal comprising: shearing means including a shear bed having an inlet side and a discharge side and shear blade means movable across said bed; means including a movable scrap-metal supporting surface positioned adjacent the inlet side of said shear bed for feeding scrap metal to said shear blade means; and means for moving said scrap metal feeding means at a relatively slow speed across said shear bed to position scrap metal on said surface beneath said blade means and for retracting said feeding means at a faster speed sufficient to jerk said supporting surface from beneath scrap metal thereon without substantially displacing the latter, whereby the metal remains substantially beneath said blade means in position to be sheared thereby and resting on said bed.

4. Apparatus defined in claim 3 wherein said feeding means includes an elongated pan having opposed upright side and an open end wall adjacent the inlet side of said shear bed, and means supporting said pan for reciprocating movement across said shear bed.

5. Apparatus defined in claim 3 wherein said shearing means includes at least two pairs of cooperating shear blades spaced apart longitudinally along said shear bed, the latter being of a different elevation adjacent each of said pairs.

6. Apparatus defined in claim 3 wherein said shearing means includes at least four pairs of cooperating shear blades spaced apart at substantially equal distances along the length of said shear bed, whereby said shearing means is operative to shear scrap metal into chunks of substantially the same length.

7. Apparatus defined in claim 3 wherein said moving means includes a hydraulic circuit.

8. Apparatus defined in claim 3 including a chamber positioned below said shear bed for receiving sheared scrap metal; hydraulic cylinder means for ejecting scrap metal from said chamber; and hydraulic circuit means for operating said movable shear blade means, said moving means, and said ejection cylinder means in timed sequence.

9. The structure defined in claim 3 wherein the shearing means includes at least two fixed shear blades spaced apart longitudinally along the shear bed with an opening therebetween, and the movable blade means cooperates with and is movable between said fixed blades into and out of said opening.

10. Apparatus for working scrap metal comprising: a shear including a shear bed having a feed side and a discharge side; a shear blade movable across said shear bed; a stationary feed table positioned adjacent said feed side of said shear bed; a feed pan on said feed table and movable across said shear bed beneath said movable shear blade; means operatively connected between said feed table and said feed pan for moving said feed pan at a relatively slow speed across said shear bed to carry scrap metal or the like in said pan beneath said shear blade and for retracting said feed pan at a faster speed sufficient to jerk said feed pan from beneath the scrap metal beneath said shear blade without susbtantially displacing the scrap metal, whereby the scrap metal is positioned for shearing.

11. Apparatus defined in claim 9 wherein said last-mentioned means includes a hydraulic cylinder and piston, and a hydraulic circuit operatively connected to said hydraulic cylinder.

12. Apparatus defined in claim 10 including an elongated slot in said feed table and lug means depending from said feed pan through said slot, said hydraulic cylinder and piston being connected to and between said lug means and said feed table.

13. Apparatus defined in claim 9 including fixed means adjacent the feed side of said bed for limiting the size of scrap metal movable by said pan beneath said movable blade.

14. Apparatus defined in claim 9 including means for ejecting sheared scrap metal from said shear.

15. Apparatus defined in claim 14 wherein said shear has a scrap-metal-receiving chamber below and in communication with said shear bed; and the ejecting means includes hydraulic piston means for ejecting scrap metal from said chamber.

16. Apparatus defined in claim 14 wherein said shear has a scrap-metal-receiving chamber below and in communication with said shear bed, said chamber having a bottom wall downwardly inclined toward a discharge opening in a side wall of said chamber.

17. Apparatus defined in claim 9 including fixed means adjacent the feed side of said bed for limiting the maximum height of scrap metal movable by said pan beneath said movable blade.

18. The structure defined in claim 9 in which the shear includes at least two fixed shear blades spaced apart longitudinally along the shear bed with an opening therebetween and at least two movable shear blades which cooperate with and are movable between said fixed blades into and out of said opening.

References Cited in the file of this patent
UNITED STATES PATENTS

| | | |
|---|---|---|
| 2,289,942 | Tafel | July 14, 1942 |
| 2,644,351 | Golay | July 7, 1953 |
| 3,039,343 | Richard | July 19, 1962 |